United States Patent [19]
Araujo

[11] Patent Number: 5,541,142
[45] Date of Patent: Jul. 30, 1996

[54] METHOD OF MAKING A COLOR FILTER BY PRECIPITATION OF CU$_2$O FROM A GLASS MATRIX

[75] Inventor: Roger J. Araujo, Horseheads, N.Y.

[73] Assignee: Corning Incorporated, Corning, N.Y.

[21] Appl. No.: 509,372

[22] Filed: Jul. 31, 1995

[51] Int. Cl.$^6$ .......................... C03C 3/089; C03C 3/093; C03C 3/087; C03C 4/02
[52] U.S. Cl. .................... 501/65; 501/66; 501/67; 501/70; 501/13; 501/905
[58] Field of Search .................. 501/65, 66, 67, 501/69, 70, 77, 13, 905

[56] References Cited

U.S. PATENT DOCUMENTS

| | | | |
|---|---|---|---|
| 2,922,720 | 1/1960 | Parks | 501/70 |
| 3,345,190 | 10/1967 | Albinak et al. | 501/70 |
| 3,902,881 | 9/1975 | Pirooz | 501/70 |
| 4,222,781 | 9/1980 | Morse et al. | 501/13 |
| 4,390,635 | 6/1983 | Morgan | 501/13 |
| 4,891,336 | 1/1990 | Prassas | 501/13 |
| 5,024,974 | 6/1991 | Nakamura et al. | 501/65 |
| 5,281,562 | 1/1994 | Araujo et al. | 501/69 |
| 5,322,819 | 6/1994 | Araujo et al. | 501/65 |

OTHER PUBLICATIONS

R. J. Araujo and S. D. Stookey, *Applied Optics*, 7 (1968), p. 778. (no month).

Primary Examiner—Mark L. Bell
Assistant Examiner—Louis M. Troilo
Attorney, Agent, or Firm—Angela N. Nwaneri

[57] ABSTRACT

A non-photochromic colored glass containing crystals of precipitated cuprous oxide in a matrix of glass, the matrix glass consisting essentially of, in cation percent, 35–75% SiO$_2$, 15–45% B$_2$O$_3$, 0–12% Al$_2$O$_3$, the Al$_2$O$_3$ being less than 10% when the SiO$_2$ is over 55%, 0–5% ZrO$_2$, 0–12% Li$_2$O, 0–20% Na$_2$O, 0–12% K$_2$O, the sum Li$_2$O+Na$_2$O+K$_2$O being 5–20%, 0–5% CaO+BaO+SrO, 0.4–1.75% Cu$_2$O, 0–2% As$_2$O$_3$, 0–2% Sb$_2$O$_3$, 0–1% SnO$_2$, the sum As$_2$O$_3$+Sb$_2$O$_3$+SnO$_2$ being 0.5–2%, characterized by 0.075 ≦ R-value ≦ 0.65, where R-value=

$$\frac{M_2O + 2MO - Al_2O_3 - ZrO_2}{B_2O_3}$$

9 Claims, 2 Drawing Sheets

METHOD OF MAKING A COLOR FILTER BY PRECIPITATION OF CU₂O FROM A GLASS MATRIX

BACKGROUND OF THE INVENTION

Color filters can be made by a wide variety of techniques. They may be based on the principles of interference or they may be based on absorption of light. In the former case, they comprise thin layers and the transmission spectrum of the filter depends on the thickness of the various layers and may also depend on the viewing angle. In the latter case, the absorptivity is an inherent property of the material from which the filter is made and the color is independent of viewing angle. Glasses are particularly convenient for making color filters because of the ease with which they are fabricated in any arbitrary shape. Furthermore, glasses can be quite robust, exhibiting both chemical durability and reasonably good scratch resistance.

Glass color filters form a special subgroup of colored glasses. In many applications of colored glasses, aesthetics impose the requirements of the color. In the applications of color filters, it is desired that the transmitted light be confined to a special spectral region. For example, it may be desired that no light of wavelength shorter than some particular value be transmitted. A filter that fulfills that requirement is sometimes called a "short wave cutoff filter." A filter transmitting no light of wavelength longer than $\lambda_1$ or shorter than $\lambda_2$ is called a "band pass filter."

Absorption of light may be achieved by a variety of phenomena. For example, light might be absorbed by stimulating transitions within a single atom. The color produced by the transition metal ions in glass exemplify this mechanism. The intensity of the color produced by this means is normally quite weak and is confined to a relatively narrow band of wavelengths. Thus, glasses colored by this means are not often useful color filters. Alternatively, very strong absorption can be achieved in glass by the precipitation of colloidal metal particles such as silver. However, as described by R. J. Araujo, and S. D. Stookey, *Applied Optics*, 7 (1968), pg. 778, the absorption bands are rather narrow and such glasses are not good color filters. According to Araujo and Stookey, in polarizing glasses containing silver colloids, the widths of the absorption bands are of the order of one hundred nanometers. In glasses which have not been stretched to make them polarizing, the absorption would be very similar to the short wave length band.

Crystalline insulators or semiconductors act effectively as short wave cutoff filters because they do not absorb light less energetic (long wavelengths) than their band gap and strongly absorb all light more energetic than their band gap. However crystalline materials are not always easily fabricated in large sizes.

If sufficiently small crystals can be precipitated in glass, absorption at short wavelengths without objectionable scattering at long wavelengths can be achieved. The precipitation of cadmium sulfoselenides in glass has long been used to make color filters. U.S. Pat. No. 5,281,562 provides a more recent example of a short wave cutoff filter which comprises very small crystals suspended in a glass matrix. In the '562 patent, the suspended crystals of cuprous halides strongly absorb all wavelengths shorter than about 400 nm and transmit essentially all of the light at longer wavelengths.

In addition to their usefulness as color filters in the ordinary sense, both of the above examples exhibit another useful property. In each case, the spectral transmittance of the filter is altered somewhat when irradiated with sufficiently intense light. This non-linear optical property is potentially useful for a variety of purposes such as optical switching. There continues to be a need for new color filters having cutoffs appropriate to specific applications. Accordingly, it is the object of the present invention to provide a color filter which exhibits non-linear optical properties.

SUMMARY OF THE INVENTION

In accordance with the present invention, a method of producing a transparent silicate glass containing minute particles of crystalline cuprous oxide is disclosed. The method comprises adding a source of copper ions and a source of polyvalent ions which act as a thermoreducing agent to the batch, melting the batch, forming a glass object and subsequently heating the glass to cause the precipitation of the cuprous oxide. Essential to the method is the correct choice of matrix glass. A necessary condition for the precipitation of cuprous oxide in a transparent glass is that the glass contain an appreciable concentration of boric oxide and that the R-value, defined as $$R = \frac{M_2O + 2MO - Al_2O_3 - ZrO_2}{B_2O_3}$$

reside within a specified range, preferably, $0.075 \leq R\text{-value} \leq 0.65$; where MO is an alkaline earth oxide (e.g., oxides of calcium, strontium, and barium), and $M_2O$ is an alkaline oxide (e.g., oxides of lithium, sodium, potassium etc.) Unless the composition matrix glass fulfills this condition, cuprous oxide cannot be controllably precipitated regardless of the concentration of copper or of thermoreducing agent in the batch and regardless of the heat treatment given to the object made by melting the batch and subsequently cooling it to form a glass. The presence of cuprous oxide in glasses fulfilling this requirement is indicated by the appearance of an orange color. It has been corroborated in a small number of cases by X-ray diffraction measurements which unequivocally identify the crystal.

The chemical durability and scratch resistance required for most practical applications impose further limitations on the composition of the glass. Glasses meeting these requirements are obtained from compositions consisting essentially of, in cation percent, 35–75% $SiO_2$, 15–45% $B_2O_3$, 0–12% $Al_2O_3$, the $Al_2O_3$ being less than 10% when the $SiO_2$ is over 55%, 0–5% $ZrO_2$, 0–12% $Li_2O$, 0–20% $Na_2O$, 0–12% $K_2O$, the sum $Li_2O+Na_2O+K_2O$ being 5–20%, 0–5% (CaO+BaO+SrO), 0.4–1.75% $Cu_2O$, 0–2% $As_2O_3$, 0–2% $Sb_2O_3$, 0–1% $SnO_2$, the sum $As_2O_3+Sb_2O_3+SnO_2$ being 0.5–2%. Fluorine is not required but it is sometimes advantageous at concentrations in weight percent, in the range of 0 to 2%. The other halogens, chlorine and bromine, are not desirable but can be tolerated at concentrations of 0.5% or less.

DETAILED DESCRIPTION OF THE INVENTION

Figure 1:
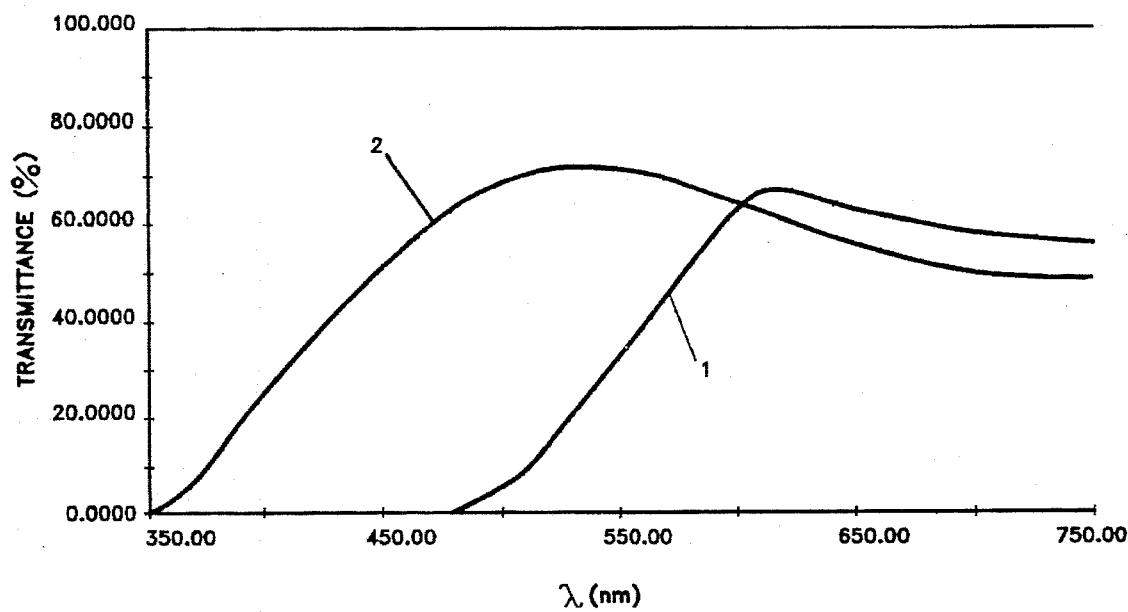
FIG. 1 compares the transmittance spectrum of glass which has been heated-treated at 635° C. for 30 minutes (line 1), with the spectrum of the same glass after it has been heated to 700° C. for an additional hour (line 2).

Cuprous oxide is a material whose band gap is in the blue region of the spectrum. That is, its band gap corresponds to a wavelength of about 475 nm. In some very thin films of cuprous oxide the absorption spectrum has exhibited a double shoulder between 475 nm and 485 nm. The absorption of light in this spectral region is believed to produce an exciton; i.e., an excited state in which coulombic forces bind the excited electron to the hole. Theoretically, if intense irradiation produces a sufficiently high density of excited electrons, screening will diminish the effect of the coulomb forces and excitons will no longer be stable. Consequently, the absorption spectrum of cuprous oxide under intense irradiation is expected to differ from the spectrum under irradiation of ordinary intensity. For these reasons, it has been desirable to precipitate in glass, cuprous oxide in the form of crystallites (i.e., having particle size less than the wavelength of light), sufficiently small for the glass to be transparent. The cuprous oxide particles are preferably, less than 250 angstroms. Previous attempts to do so have failed, producing only metallic copper particles.

Monovalent ions of copper or silver are very soft Lewis acids and are not very stable in borate or silicate glasses. Both are easily reduced to neutral atoms by other polyvalent ions. In addition to being easily reduced, the cuprous ion can be removed from solution in glasses by disproportionation. Monovalent halides of either ion can be precipitated from certain host glasses. These behavior patterns can be qualitatively explained by the well known principle that soft acids prefer to be bonded to soft bases. Since the oxygen atoms in the forms in which they are incorporated in borate and silicate glasses are hard bases, both monovalent silver and monovalent copper "prefer" to be bonded to an atom which is a softer base. Hence the formation, for example, of silver halides in photochromic glasses or of cuprous halides in glasses which absorb ultraviolet light.

The glasses from which $Cu_2O$ can be precipitated are uniformly glasses from which cuprous halide can be precipitated in the presence of high enough concentration of halogens. Although not intended as a limitation on the instant invention, a possible mechanism is now proposed. In borosilicate glasses characterized by a certain range of R-values, boron is bonded to oxygen in a manner which varies with temperature. At high temperatures, a substantial fraction of the oxygen atoms are covalently bonded to only one glass forming cation; whereas, in the low temperature regime, essentially all of the oxygen is bonded to two glass forming cations (bridging oxygen atoms). In such a state the oxygen atom is a harder Lewis base (less polarizable) than in the high temperature configuration. It is believed that in either of these configurations, the oxygen atom is a harder base than it is in metal oxide crystals. Although the quantum mechanical explanations have not been completely satisfactory, it has been known empirically for many years, that stronger bonds are formed if acid and base are both soft or are both hard instead of one being hard and one being soft. The monovalent copper ion, like the silver ion, is a soft acid. Thus, according to acid-base theory, these ions will form stronger bonds to anions that are soft bases.

Although it is expected that the strength of the copper oxygen bond is stronger in a cuprous oxide crystal than it is in glass even in the high temperature regime, the difference in that regime is too small to balance the entropy loss involved in the precipitation of copper oxide. In the low temperature regime, entropy is not very important; furthermore, the difference in the bond strengths is greater. As a result of the combination of these two effects, precipitation occurs. This proposed mechanism is strongly analogous to that proposed for the precipitation of soft acid metal halides.

The following tables illustrate host glasses from which cuprous oxide can or cannot be precipitated. Table 1 displays the compositions and colors of several glasses which vary in halogen concentration. A yellow orange color was observed in several glasses which contained arsenic, fluoride, and low levels of chloride and bromide. The orange color was not observed in glasses which contained higher levels of the latter two halides. Nor was it observed when they were totally absent unless a higher level of arsenic was utilized. X-ray diffraction measurements indicated the presence of cuprous oxide in glasses ZV and DV, both of which exhibited the orange color. All of the glasses were held at 575° C. for one hour and at 625° C. for an additional hour. The color listed in the tables refer to heat treated samples unless otherwise indicated.

TABLE 1

Influence of Halogen On Precipitation of Cuprous Oxide

| Sample ID | ZN | ZQ | ZV | ABI | ABJ | ABK | ADV |
|---|---|---|---|---|---|---|---|
| Oxide | Composition in Cation Percent | | | | | | |
| $SiO_2$ | 46.0 | 46.0 | 46.0 | 46.0 | 46.0 | 46.0 | 46.0 |
| $Al_2O_3$ | 10.5 | 10.5 | 9.0 | 9.0 | 9.0 | 9.0 | 9.0 |
| $B_2O_3$ | 23.8 | 23.8 | 26.7 | 26.7 | 26.7 | 26.7 | 26.7 |
| $Li_2O$ | 6.25 | 6.25 | 3.5 | 3.5 | 3.5 | 3.5 | 3.5 |
| $Na_2O$ | 11.0 | 11.0 | 13.3 | 13.3 | 13.3 | 13.3 | 13.3 |
| $K_2O$ | 1.5 | 1.5 | 1.5 | 1.5 | 1.5 | 1.5 | 1.5 |
| $As_2O_3$ | 0.5 | 0.5 | 0.5 | 0.65 | 0.65 | 0.65 | 1.5 |
| CuO | 0.5 | 0.5 | 0.5 | 0.5 | 0.5 | 0.5 | 0.65 |
| | Halogens in Weight Percent | | | | | | |
| F | 1.5 | 1.5 | 1.9 | 2.0 | 2.0 | 2.0 | 2.0 |
| Cl | 0.25 | 0.60 | 0.25 | — | 0.25 | 0.60 | — |
| Br | 0.25 | 0.40 | 0.25 | — | 0.25 | 0.60 | — |
| R-value | 0.35 | 0.35 | 0.35 | 0.35 | 0.35 | 0.35 | 0.35 |
| Color | Orange | Blue | Orange | Green | Orange | Blue | Orange |

Because X-ray diffraction measurements on glasses ZV and ADV yielded no lines other than those consistent with cuprous oxide, it was plausible that the yellow color was associated with that phase. One can rule out the possibility that the color was associated with some other phase having particles too small to produce diffraction lines by demonstrating that neither fluorine nor arsenic was essential to produce the yellow color. This is done in Table 2. The differences in the color are due merely to the varying strength of the absorption. The absorption edge is essentially at the same wavelength for all of the glasses in Table 2 whose color is indicated as yellow, orange, brown, or red. The small amount of arsenic (0.05) in those glasses containing antimony is introduced as an impurity and is believed to be inconsequential. Glass CFJ proves that neither arsenic nor fluoride is essential. If the level of copper is moderately low (e.g., 0.75 as in the CIC glass), then the use of antimony or tin in place of arsenic does not produce cuprous oxide unless fluoride is present (e.g., as in the CIB glass).

TABLE 2

The Influence of Fluorine and Arsenic

| Sample ID | CHY | CHZ | CIB | CIC | CCT | CCU | CFJ |
|---|---|---|---|---|---|---|---|
| Oxide | Composition in Cation Percent | | | | | | |
| $SiO_2$ | 50.0 | 50.0 | 50.0 | 50.0 | 50.0 | 50.0 | 50.0 |
| $Al_2O_3$ | 7.5 | 7.5 | 7.5 | 7.5 | 7.5 | 7.5 | 7.5 |
| $B_2O_3$ | 25.9 | 25.9 | 25.9 | 25.9 | 25.9 | 25.9 | 25.9 |
| $Li_2O$ | 3.5 | 3.5 | 3.5 | 3.5 | 3.5 | 3.5 | 3.5 |
| $Na_2O$ | 11.6 | 11.6 | 11.6 | 11.6 | 11.6 | 11.6 | 11.6 |
| $K_2O$ | 1.5 | 1.5 | 1.5 | 1.5 | 1.5 | 1.5 | 1.5 |
| $SnO_2$ | — | — | 0.35 | 0.35 | — | — | — |
| $Sb_2O_3$ | 1.5 | 1.5 | — | — | — | — | 1.5 |
| $As_2O_3$ | 0.05 | 0.05 | — | — | 1.5 | 1.5 | 0.05 |
| CuO | 0.75 | 0.75 | 0.75 | 0.75 | 0.75 | 1.25 | 1.25 |
| Halogens in Weight Percent | | | | | | | |
| F | 2.0 | — | 2.0 | — | — | — | — |
| Color | Yellow | Green | Orange | Green | Orange | Red | Brown |
| Heat Treat | 100° C. 3 days | 500° C. 3 days | 500° C. 3 days | 100° C. 3 days | 500° C. 16 hr | 500° C. 16 hr | 625° C. 64 hr |

Glass CIX in Table 3 indicates that cuprous oxide is not obtained when the glass contains no more than 0.35 cation percent copper even if it contains fluoride. Glass CIV indicates that 0.75 cation percent copper is sufficient to produce cuprous oxide even in the absence of fluoride.

Glass CJA indicates that, even in a glass with an R-value as high as 0.6, the oxide can be precipitated if the copper level is sufficiently high.

TABLE 3

Influence of R-Value

| Sample ID | CIV | CIW | CIX | CJA | CJB | CJC | CJD |
|---|---|---|---|---|---|---|---|
| Oxide | Composition in Cation Percent | | | | | | |
| $SiO_2$ | 50.0 | 50.0 | 50.0 | 50.0 | 50.0 | 50.0 | 50.0 |
| $Al_2O_3$ | 7.5 | 7.5 | 7.5 | 7.5 | 7.5 | 7.5 | 7.5 |
| $B_2O_3$ | 25.0 | 25.0 | 25.0 | 21.9 | 29.2 | 25.9 | 23.3 |
| $Li_2O$ | 3.5 | 3.5 | 3.5 | 3.5 | 3.5 | 3.5 | 3.5 |
| $Na_2O$ | 12.5 | 12.5 | 12.5 | 15.6 | 8.3 | 11.6 | 14.2 |
| $K_2O$ | 1.5 | 1.5 | 1.5 | 1.5 | 1.5 | 1.5 | 1.5 |
| $As_2O_3$ | 1.5 | 1.5 | 1.5 | 1.5 | 1.5 | 1.5 | 1.5 |
| CuO | 0.75 | 1.0 | 0.35 | 1.25 | 0.90 | 0.90 | 0.90 |
| R-value | 0.4 | 0.4 | 0.4 | 0.6 | 0.2 | 0.35 | 0.5 |
| Halogens in Weight Percent | | | | | | | |
| F | — | — | 2.0 | — | — | — | — |
| Heat Treat | 500° C. for 16 Hours | | | | | | |
| Color | Green | Red | Green | Orange | Hazy Orange | Clear Orange | Green |
| Heat Treat | 475° C. for 68 hours | | | | | | |
| Color | Orange | Red | Green | Red | Hazy Orange | Clear Orange | Pale Yellow |

The influence of the composition of the matrix glass is suggested by glasses CJB, CJC, and CJD. There is less of a tendency to produce cuprous oxide in glasses with a high R-value. In glass CJB, which has the lowest R-value of the three glasses, the haze level indicates significant precipitation of $Cu_2O$. In glass CJD, which has the highest R-value of the three, the tendency for $Cu_2O$ to precipitate is considerably weaker. No precipitation is observed in the CJD glass that was heat treated at 500° C. for 16 hours. However, after sufficiently long heat treatment, for example, at 475° C. for 68 hours, a pale yellow color is observed in the CJD glass, indicating a slight $Cu_2O$ precipitation.

Effect of R-value on Precipitation of Cuprous Oxide

Because the silica level (and, accordingly, the ratio of silicon to boron) has been varied only slightly in the examples considered thus far, it is not clear whether the solubility of cuprous oxide depends only on the total number of non-bridging oxygen atoms or if it is specifically related to the boron concentration. Table 4 and Table 5 illustrate that the precipitation of the cuprous oxide phase is diminished at high R-values in either low or high silica glasses. Table 5 also illustrates the fact that in the absence of boron, no precipitation is observed in glasses differing considerably in silica, alumina, and alkali.

TABLE 4

Influence of R-Value

| Sample ID | CLG | CLH | CLK | CLL | CLO |
|---|---|---|---|---|---|
| Oxide | Composition in Cation Percent | | | | |
| SiO$_2$ | 35.0 | 35.0 | 35.0 | 35.0 | 34.6 |
| Al$_2$O$_3$ | 5.0 | 5.0 | 5.0 | 5.0 | 13.1 |
| B$_2$O$_3$ | 44.0 | 36.7 | 44.0 | 44.0 | 26.1 |
| Na$_2$O | 16.0 | 23.3 | 16.90 | 16.0 | 26.1 |
| As$_2$O$_3$ | 1.5 | 1.5 | 1.5 | 1.5 | 1.5 |
| CuO | 1.0 | 1.0 | 0.75 | 0.50 | 1.0 |
| R-value | 0.25 | 0.50 | 0.25 | 0.25 | 0.50 |
| Heat Treatment = 500° C./68 hours | | | | | |
| Color | Orange | Green | Yellow | Green | Green |

TABLE 5

Influence of Boron

| Sample ID | CKX | CKY | CKZ | CLA | CLB | CLD | CLF |
|---|---|---|---|---|---|---|---|
| Oxide | Composition in Cation Percent | | | | | | |
| SiO$_2$ | 65.0 | 65.0 | 65.0 | 75.0 | 65.0 | 45.0 | 35.0 |
| Al$_2$O$_3$ | 5.0 | 5.0 | 5.0 | 5.0 | 5.0 | 15.0 | 25.0 |
| B$_2$O$_3$ | 20.0 | 16.7 | 14.3 | — | — | — | — |
| Na$_2$O | 10.0 | 13.3 | 15.7 | 20.0 | 30.0 | 40.0 | 40.0 |
| As$_2$O$_3$ | 1.5 | 1.5 | 1.5 | 1.5 | 1.5 | 1.5 | 1.5 |
| CuO | 1.0 | 1.0 | 1.0 | 1.0 | 1.0 | 1.0 | 1.0 |
| R-value | 0.25 | 0.50 | 0.75 | — | — | — | — |
| Heat Treat = 500° C. for 68 hours | | | | | | | |
| Color | Orange | Orange | Green | Blue | Blue | Blue | Green |

The observation that there is less of a tendency to precipitate cuprous oxide in a glass with a high R-value regardless of the silica level raises the question of the behavior of glasses with low R-values. Table 6 indicates that no precipitation is observed at R-values below 0.075. The influence of the glass matrix appears to be quite analogous to the influence on the precipitation of silver or cuprous halides.

TABLE 6

Effect of Low R-Values

| Sample ID | CMZ | CNB | CND | CNE | CNF | CNG | CNH |
|---|---|---|---|---|---|---|---|
| Oxide | Composition in Cation Percent | | | | | | |
| SiO$_2$ | 50.0 | 50.0 | 50.0 | 50.0 | 50.0 | 50.0 | 45.0 |
| Al$_2$O$_3$ | 7.5 | 7.5 | 7.5 | 7.5 | 7.5 | 7.5 | 15.0 |
| B$_2$O$_3$ | 28.0 | 32.6 | 35.0 | 32.6 | 30.4 | 28.0 | 25.0 |
| Na$_2$O | 14.5 | 9.94 | 7.5 | 9.94 | 12.1 | 14.5 | 15.0 |
| As$_2$O$_3$ | 1.5 | 1.5 | 1.5 | 1.5 | 1.5 | 1.5 | 1.5 |
| CuO | 0.75 | 0.75 | 0.75 | 0.75 | 0.75 | 0.75 | 0.75 |
| R-value | 0.25 | 0.075 | 0.0 | 0.075 | 0.15 | 0.25 | 0.0 |
| Halogens in Weight Percent | | | | | | | |
| F | — | — | 2.0 | 2.0 | 2.0 | 2.0 | — |
| Heat Treat = 500° C. for 68 hours | | | | | | | |
| Color | Orange | Green | Green | Green | Yellow | Orange | Green |

Effect of Temperature on Precipitation of Cuprous Oxide

In some cases, a yellow color was produced when a glass was heat treated at a relatively low temperature, but not when it was heat treated at a slightly higher temperature. Table 7 lists several examples of this. Further, the appearance of the yellow color was reversible. As shown in FIG. 1, the absorption induced by a low temperature treatment disappeared when the glass was subsequently heated at a higher temperature. The induced absorption reappeared when the glass was again heated at the lower temperature. The large temperature dependence of solubility of the cuprous oxide has one unfortunate consequence. It places an upper limit on the temperature of heat treatment. Therefore, the heat treatment is limited to the temperature regime wherein growth rates are rather small and nucleation rates are large.

The highest temperature at which the glass can be heated in order to precipitate cuprous oxide depends on the amount of silica in the glass. At the highest levels of silica, 750° C. is the maximum temperature. In glasses with lower silica levels, heat treatment must be done at somewhat lower temperatures. Only the time required for the precipitation of the cuprous oxide imposes a lower limit on the temperature. If it is assumed that heat treatments requiring more than one hundred hours are not practical, then 475° C. is the lowest practical temperature for those applications where time is a factor.

Figure 2:
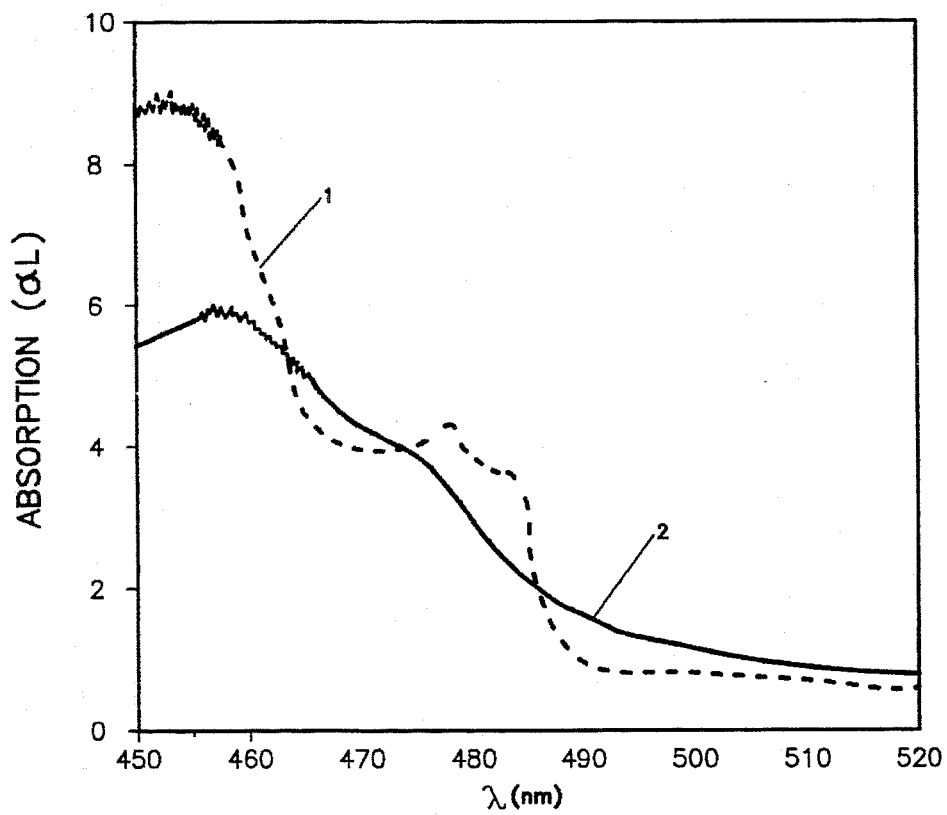
FIG. 2 compares the low temperature (11° K.) absorption spectrum of a glass heated at 650° C. for 30 minutes (line 1), with the absorption spectrum of the same glass at room temperature (line 2).
Figure 3:
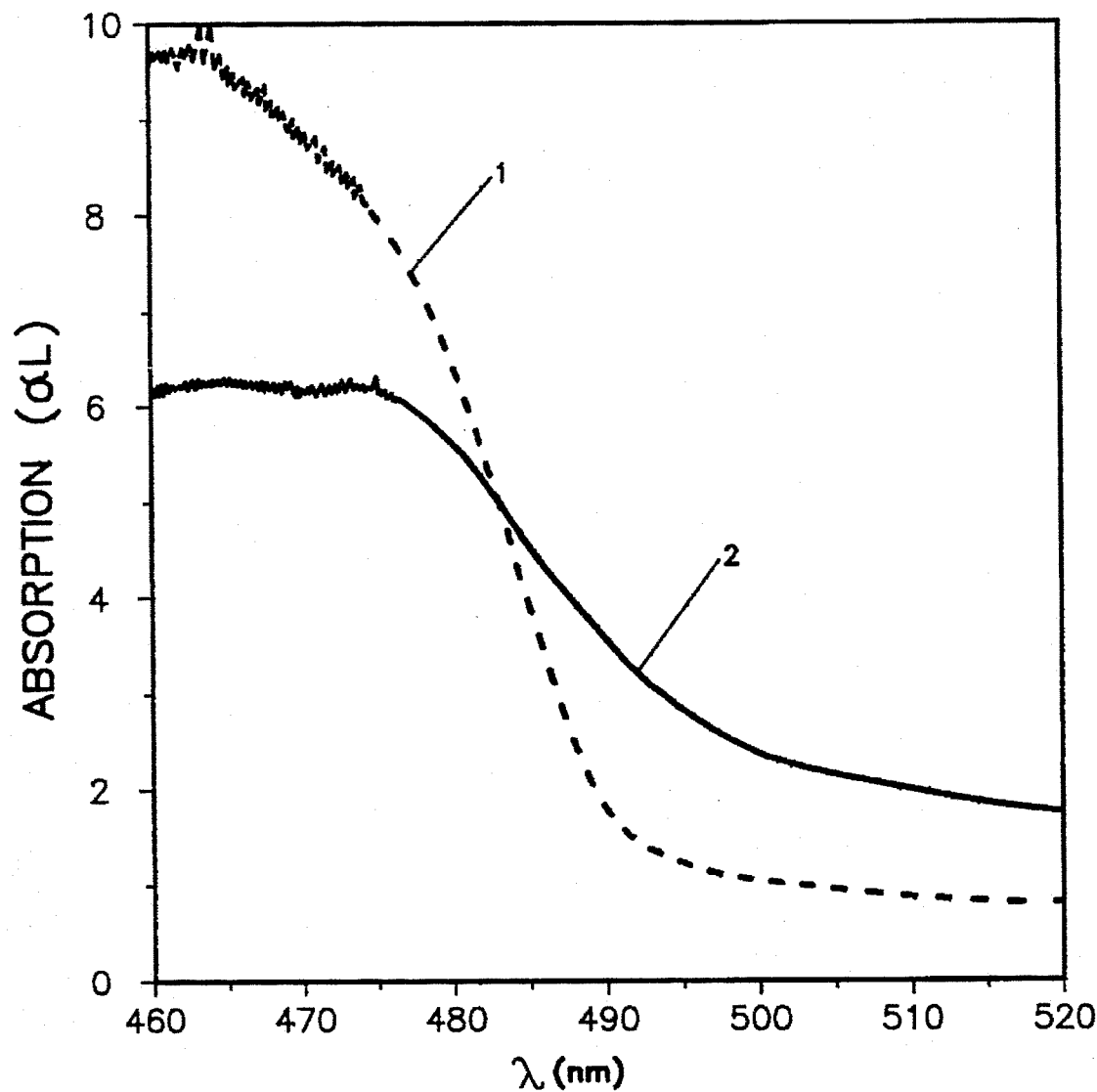
FIG. 3 compares the low temperature (11° K.) absorption spectrum (line 1), of a glass having the same composition as the glass of FIG. 2, with the room temperature spectrum (line 2), after the glass has been heat treated at 550° C. for 4 hours.

The heat treatment exerts an influence on the detailed shape of the absorption spectrum of the color filter and on its non-linear optical properties. As illustrated in FIGS. 2 and 3, glasses heated for a short time at a high temperature exhibit a double shoulder in the spectral region between 470 nm and 490 nm (FIG. 2), whereas glasses heated for long times at a low temperature exhibit no shoulder in this spectral region (FIG. 3). The absorption in the spectral region of the shoulders can be bleached by intense radiation. In glasses exhibiting no shoulder, intense radiation induces additional absorption at wavelengths longer than 490 nm. Thus, different heat treatments cause the filter to exhibit somewhat different non-linear optical effects.

TABLE 7

Influence of Temperature

| Sample ID | BWY | CBE | CBF | CDA |
|---|---|---|---|---|
| Oxide | Composition in Cation Percent | | | |
| $SiO_2$ | 50.0 | 50.0 | 50.0 | 50.0 |
| $Al_2O_3$ | 7.5 | 7.5 | 7.5 | 7.5 |
| $B_2O_3$ | 25.9 | 25.9 | 25.9 | 28.0 |
| $Li_2O$ | 3.5 | 3.5 | 3.5 | 3.5 |
| $Na_2O$ | 11.6 | 11.6 | 11.6 | 9.5 |
| $K_2O$ | 1.5 | 1.5 | 1.5 | 1.5 |
| $As_2O_3$ | 1.5 | 1.5 | 1.5 | 1.5 |
| CuO | 0.75 | 0.75 | 0.75 | 0.75 |
| R-value | 0.35 | 0.35 | 0.35 | 0.25 |
| Halogens in Weight Percent | | | | |
| F | 2.0 | 1.0 | 3.5 | 2.0 |
| Heat Treat | 630° C./60 min | 635° C./60 min | 700° C./60 min | 500° C./16 hr |
| Color | Yellow | Yellow | Orange | Orange |
| Heat Treat | 725° C./60 min | 700° C./30 min | 750° C./30 min | 725° C./60 min |
| Color | Green | Green | Green | Green |
| Heat Treat $Cu^{+2}$ | | | | 500° C./16 hr 0.030 |
| Heat Treat $Cu^{+2}$ | | | | 725° C./60 min 0.103 |

I claim:

1. A color filter containing crystals of precipitated cuprous oxide in a matrix glass, the matrix glass consisting essentially of, in cation percent, 35–75% $SiO_2$, 15–45% $B_2O_3$, 0–12% $Al_2O_3$, 0–5% $ZrO_2$, 0–12% $Li_2O$, 0–20% $Na_2O$, 0–12% $K_2O$, 0–5% (CaO+BaO+SrO), 0.4–1.75% $Cu_2O$, 0–2% $As_2O_3$, 0–2% $Sb_2O_3$, and 0–1% $SnO_2$, wherein, the sum of ($Li_2O+Na_2O+K_2O$) is 5–20%, the sum of ($As_2O_3+Sb_2O_3+SnO_2$) is 0.5–2%, and the $Al_2O_3$ is less than 10% when the $SiO_2$ is greater than 55%.

2. A color filter according to claim 1 further comprising in weight percent, 0–0.25 Cl, 0–0.25 Br, and 0–2.0 F.

3. A color filter according to claim 1, further characterized by 0.075≦R-value≦0.65 where R-value=

$$R\text{-value} = \frac{M_2O + 2MO - Al_2O_3 - ZrO_2}{B_2O_3}$$

4. A method of making a colored glass containing particles of crystalline cuprous oxide, the method comprising, combining sources of copper and polyvalent ions with a glass batch to form a glass matrix; melting the batch; and heating the glass to cause precipitation of the cuprous oxide.

5. The method of claim 4, wherein the glass matrix consists essentially of, in cation percent, 35–75% $SiO_2$, 15–45% $B_2O_3$, 0–12% $Al_2O_3$, 0–5% $ZrO_2$, 0–12% $Li_2O$, 0–20% $Na_2O$, 0–12% $K_2O$, 0–5% (CaO+BaO+SrO), 0.4–1.75% $Cu_2O$, 0–2% $As_2O_3$, 0–2% $Sb_2O_3$, and 0–1% $SnO_2$, wherein, the $Al_2O_3$ is less than 10% when the $SiO_2$ is greater than 55%, the sum of ($Li_2O+Na_2O+K_2O$) is 5–20%, and the sum of ($As_2O_3+Sb_2O_3+SnO_2$) is 0.5–2%.

6. The method of claim 5, wherein the glass is characterized by R-value in the range of 0.075≦R-value≦0.65 where $$R\text{-value} = \frac{M_2O + 2MO - Al_2O_3 - ZrO_2}{B_2O_3}$$

7. The method of claim 4, wherein the glass matrix further comprises, in weight percent, 0–0.5 Cl, 0–0.5 Br, and 0–2.0 F.

8. The method of claim 4, wherein the cuprous oxide precipitate is characterized by particle size less than or equal to 250 angstroms.

9. A colored glass according to claim 4, wherein the glass is heated at a temperature in the range of 475° C. to 750° C., for a period of time in the range of 0.5 to 100 hours, to produce the color.

* * * * *

UNITED STATES PATENT AND TRADEMARK OFFICE
CERTIFICATE OF CORRECTION

PATENT NO. : 5,541,142
DATED : July 30, 1996
INVENTOR(S) : Roger J. Araujo

It is certified that error appears in the above-indentified patent and that said Letters Patent is hereby corrected as shown below:

Table 2, Column 5, "CHY Heat 100°"   Page 8, Table 2 should read --500°--.

Signed and Sealed this

Twenty-second Day of October, 1996

Attest:

BRUCE LEHMAN

*Attesting Officer*   Commissioner of Patents and Trademarks